the 
United States Patent Office 2,970,983
Patented Feb. 7, 1961

2,970,983
EPOXY-CONTAINING CONDENSATES OF POLY-EPOXIDES AND ACIDIC MATERIALS, THEIR PREPARATION AND POLYMERS

Herbert A. Newey, Lafayette, Calif., assignor to Shell Oil Company, New York, N.Y., a corporation of Delaware No Drawing. Filed Sept. 10, 1956, Ser. No. 608,681

18 Claims. (Cl. 260—47)

This invention relates to new epoxy-containing materials and a method for their preparation. More particularly, the invention relates to new epoxy-containing condensates of polyepoxides and acidic materials, their preparation and polymers.

Specifically, the invention provides new and particularly useful acetone-soluble non-heat curable epoxy-containing materials comprising condensates of an acidic material of the group consisting of polybasic acids, polybasic acid anhydrides and mixtures thereof with at least 1.5 times the chemical equivalent amount of a polyepoxide containing more than one vic-epoxy group. These materials are prepared according to the present invention by adding the acidic materials, preferably in small increments over a period of time, to at least 1.5 times the equivalent amount of the polyepoxide in the presence of a catalyst of the group consisting of tertiary amines, quaternary ammonium salts and organic phosphines.

The invention further provides insoluble infusible products obtained by contacting the above-described novel epoxy-containing condensates with epoxy curing agents, such as, for example, amines, polybasic acid anhydrides, $BF_3$ and $BF_3$-complexes.

Relatively low molecular weight monomeric polyepoxides, such as diglycidyl ether of bis-phenol-A, can be cured to form products having good strength and chemical resistance. Such products have been found to be particularly useful in the preparation of plastic products such as pottings and castings, but because of the low molecular weight of the starting epoxides they have not been particularly suited for use in preparing superior surface coatings, such as varnishes, can coatings and the like. The use of these products has also been limited by the fact that many of them have rather poor compatibility with various resins and other materials used in coatings, and because the products in some cases have rather poor water resistance.

It is therefore an object of the invention to provide a new class of epoxy-containing materials. It is a further object to provide a new class of relatively high molecular weight epoxy-containing materials that can be derived from the low molecular weight polyepoxide materials. It is a further object to provide new high molecular weight epoxy-containing materials which are particularly suited for use in preparing surface coatings. It is a further object to provide new epoxy-containing materials which can be cured to form products having improved flexibility and water resistance. It is a further object to provide new epoxy-containing materials that have improved solubility and compatibility characteristics. It is a further object to provide new high molecular weight epoxy-containing materials that can be readily cured with epoxy curing agents to form hard chemical resistant products. Other objects and advantages of the invention will be apparent from the following detailed description thereof.

It has now been found that these and other objects may be accomplished by the new products of the invention comprising acetone-soluble non-heat curable relatively high-molecular weight epoxy-containing condensates of acidic material of the group consisting of polybasic acids, polybasic acid anhydrides and mixtures thereof with at least 1.5 times the chemical equivalent amount of a polyepoxide containing more than one vic-epoxy group, said condensates being prepared according to the present invention preferably by adding the acidic materials preferably in small increments over a period of time to at least 1.5 times the equivalent amount of the polyepoxide in the presence of a catalyst of the group consisting of tertiary amines, quaternary ammonium salts and organic phosphines.

The above-described novel epoxy-containing condensates of the invention have been found to be particularly suited for use in the preparation of surface coatings as they can be cured with epoxy curing agents to form very attractive films. The films, due in part to the high molecular weight of the products, are unusually hard and strong and are quite distensible, and, due in part to their epoxy composition, possess excellent resistance to chemicals and have good adhesion. The new products, and particularly those prepared from the polybasic anhydrides, also give cured films which have outstanding resistance to water and thus could be used alone or in combination with other epoxy-containing surface coating compositions to give water-resistance varnishes and the like. The new products prepared from the aliphatic or cycloaliphatic polybasic acids or anhydrides are especially preferred as they possess improved compatibility with many materials, such as asphaltic materials, which epoxy compounds had been incompatible heretofore, and, in addition, when cured give coatings having superior flexibility.

The polyepoxide materials to be used in preparing the new condensates of the present invention comprise those organic materials which have more than one vic-epoxy group, i.e. more than one

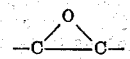

group, which group may be in a terminal position, i.e. a

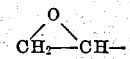

group, or in an internal position, i.e. a

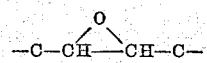

The polyepoxides may be saturated or unsaturated, aliphatic, cycloaliphatic, aromatic or heterocyclic and may be substituted with substituents, such as chlorine, hydroxyl groups ether radicals, and the like.

Examples of such polyepoxides, include, among others, 1,4-bis(2,3-epoxypropoxy)benzene, 1,3-bis(2,3-epoxypropoxy)benzene, 4,4'-bis(2,3-epoxypropoxy) diphenyl ether, 1,8 - bis(2,3-epoxypropoxy)octane, 1,4-bis(2,3-epoxypropoxy)cyclohexane, 4,4'-bis(2-hydroxy-3,4'-epoxybutoxy) diphenyl dimethylmethane, 1,3-bis(4,5-epoxypentoxy)-5-chlorobenzene, 1,4-bis(3,4-epoxybutoxy)-2-cyclorocyclohexane, 1,3-bis(2-hydroxy-3,4-epoxybutoxy)benzene, 1,4-bis-(2-hydroxy-4,5-epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, cathechol, hydroquinone, methyl resorcinol, or polynuclear phenols, such as 2,2-bis(4-hydroxyphenyl) propane (Bisphenol-A), 2,2-bis(4 - hydroxyphenyl)butane, 4,4'-dihydroxybenzophenone, bis(4-hydroxyphenyl) ethane, 2,2-bis(4-hydroxyphenyl)pentane and 1,5-dihydroxynaphthalene. The halogen-containing epoxides may be further exemplified by 3-chloro-1,2-epoxybutane, 3- bromo-1,2-epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of two of the glycidyl polyethers of dihydric phenols will be illustrated below. Unless otherwise specified, parts indicated are parts by weight.

PREPARATION OF GLYCIDYL POLYETHERS OF DIHYDRIC PHENOLS

Polyether A

About 2 moles of 2,2-bis(4-hydroxyphenyl)propane was dissolved in 10 moles of epichlorohydrin and 1% to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50. For convenience this product will be referred to hereinafter as Polyether A.

Polyether B

A solution consisting of 11.7 parts of water, 1.22 parts of sodium hydroxide, and 13.38 parts of 2,2-bis-(4-hydroxyphenyl)propane was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at a temperature of 20° C. to 30° C. was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durrans' Mercury Method and a molecular weight of 483. The product had an epoxy value eq./100 g. of 0.40. For convenience, this product will be referred to as Polyether B.

The glycidyl polyethers of polyhydric phenols obtained by condensing the polyhydric phenols with epichlorohydrin as described above, are also referred to as "ethoxyline" resins. See Chemical Week, vol. 69, page 27, for September 8, 1951.

Another group of polyepoxides comprises the polyepoxypolyethers obtained by reacting, preferably in the presence of an acid-acting compound, such as hydrofluoric acid, one of the aforedescribed halogen-containing epoxides, such as epichlorohydrin, with a polyhydric alcohol, and subsequently treating the resulting product with an alkaline component. As used herein and in the claims, the expressions "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4-hydroxycyclohexyl)dimethylmethane and the like.

The preparation of one of these polyepoxide polyethers may be illustrated by the following:

PREPARATION OF GLYCIDYL POLYETHERS OF POLYHYDRIC ALCOHOLS

Polyether C

About 276 parts (3 moles) of glycerol was mixed with 832 parts (9 moles) of epichlorohydrin. To this reaction mixture was added 10 parts of diethyl ether solution containing about 4.5% boron trifluoride. The temperature of this mixture was between 50° C. and 75° C. for about 3 hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amounts of 261 parts, was a pale yellow viscous liquid. It has an epoxide value of 0.671 equivalent per 100 grams and the molecular weight was 324 as measured ebullioscopically in dioxane solution. The epoxy equivalency of this product was 2.13. For convenience, this product will be referred to hereinafter as Polyether C.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

Another group of polyepoxides include the epoxy esters of polybasic acids, such as diglycidyl phthalate and diglycidyl adipate, diglycidyl tetrahydrophthalate, diglycidyl maleate, epoxidized dimethallyl phthalate and epoxidized dicrotyl phthalate.

Examples of polyepoxides having internal epoxy groups include, among others, the epoxidized esters of polyethylenically unsaturated monocarboxylic acids, such as epoxidized linseed,
soyabean,
perilla,
oiticica,
tung,
walnut and dehydrated castor oil,
methyl linoleate,
butyl linolenate,
ethyl 9,12-octadecadienoate,
butyl 9,12,15-octadecatrienoate,
ethyl elaeostearate,
octyl 9,12-octadecadienoate,
methyl elaeostearate,
monoglycerides of tung oil fatty acids,
monoglycerides of soyabean oil,
sunflower,
rapeseed,
hempseed,
sardine,
cottonseed oil,
and the like.

Another group of the epoxy-containing materials having internal epoxy groups include the epoxidized esters of unsaturated alcohols having the ethylenic group in an internal position and polycarboxylic acids, such as, for example, di(2,3-epoxybutyl)adipate,
di(2,3-epoxybutyl)oxalate,
di(2,3-epoxyhexyl)succinate,
di(2,3-epoxyoctyl)tetrahydrophthalate,
di(4,5-epoxydodecyl)maleate,
di(2,3-epoxybutyl)terephthalate,
di(2,3-epoxypentyl)thiodipropionate,
di(2,3-epoxybutyl)citrate and
di(4,5-epoxyoctadecyl)malonate, as well as the esters of epoxycyclohexanol and epoxycyclohexylalkanols, such as 2,3-epoxycyclohexylmethanol, and polycarboxylic acids, such as, for example di(2,3-epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate,
3,4-epoxyhexyl 3,4-epoxypentanoate,
3,4-epoxycyclohexyl 3,4-cyclohexanoate,
2,3-epoxycyclohexylmethyl 2,3-epoxycyclohexanoate, and
3,4-epoxycyclohexyl 4,5-epoxyoctanoate, and the like.

Another group of materials having internal epoxy groups include epoxidized esters of unsaturated monocarboxylic acids and polyhydric alcohols, such as ethylene glycol di(2,3-epoxycyclohexanoate),
glycerol tri(2,3-epoxycyclohexanoate) and
pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,12,13-diepoxyeicosanedioate,
dibutyl 7,8,11,12-diepoxyoctadecanedioate,
dioctyl 10,11-diethyl-8,9,12,13-diepoxyeicosanedioate,
dicyclohexyl 3,4,5,6-diepoxycyclohexane-dicarboxylate,
dibenzyl 1,2,4,5-diepoxycyclohexane-1,2-dicarboxylate and
diethyl 5,6-, 10,11-diepoxyoctadecyl succinate.

Still another group comprising the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes the epoxidized hydrocarbons, such as epoxidized 2,2-bis(cyclohexenyl)propane, 2,2-bis(cyclohexenyl)butane, 8,10-octadecadiene and the like.

The polycarboxylic acids and anhydrides used in preparing the condensates of the present invention comprise the organic acids possessing at least two carboxyl groups and their corresponding anhydrides. The acids may be saturated, unsaturated, aliphatic, cycloaliphatic or aromatic and may be substituted with non-interfering groups, such as OH groups, halogen atoms ether groups and the like. Examples of these acids and anhydrides include, among others, phthalic anhydride, isophthalic acid, terephthalic acid, adipic acid, succinic acid, suberic acid, azelaic acid, butylsuccinic acid, octadecylsuccinic acid, dodecylsuccinic acid, chlorosuccinic acid, dimer and trimer acids obtained by polymerizing unsaturated fatty acids, such as soyabean oil fatty acids and the like, glutaconic acid, tricarballylic acid, aconitic acid, itaconic acid, diglycolic acid, maleic acid, maleic anhydride, 1,8-naphthalenic acid, tetrahydrophthalic anhydride, 3-methoxyhexahydrophthalic anhydride, allylmalonic acid, 4-cyclohexene-1,3-dicarboxylic acid, 3-hexyl-4-cyclohexene-1,2-dicarboxylic acid, 3-methyl-3,5-cyclohexadiene-1,2-dicarboxylic acid, eicosenylsuccinic acid, diphenyldicarboxylic acid, thiodipropionic acid, sulfonyldibutyric oxydibutyric, 1,3,5-pentanetricarboxylic, trimellitic, dinicotinic, citric, tartaric, methoxyphthalic, quinolinic and cinchomeronic acids.

Preferred polycarboxylic acids and anhydrides to be used are the aliphatic, cycloaliphatic and aromatic dicarboxylic acids containing no more than 20 carbon atoms.

The novel condensates of the present invention are prepared by reacting the polybasic acid, polybasic acid anhydrides or mixture thereof with the polyepoxide in the presence of the hereinafter described catalysts.

The amount of the reactants to be employed is critical. Unless the proper proportions are utilized, the resulting product will be an insoluble infusible product free of epoxy groups. In order to obtain the soluble epoxy-containing condensates of the present invention, it is essential that the acidic component be reacted with at least 1.5 times chemical equivalent amount of the polyepoxide. As used herein, and in the appended claims, the expression "chemical equivalent" in relation to the acidic and polyepoxide mixtures refers to the amount needed to furnish one epoxy group for every acidic group. Preferably, the acidic component and the polyepoxides are combined in chemical equivalent ratio of 1:2 to 1:4. If the acidic component is tri-functional or higher, a large excess of the polyepoxide is preferred.

If the acidic component is an acid, the method of adding is also important. It is usually desirable to slowly add the acid to the polyepoxide over a period of time in order to prevent conversion of the product to insoluble infusible state.

The catalysts used in the preparation process include the tertiary amines, quaternary ammonium salts and organo-substituted phosphines.

The tertiary amines that may be used as catalysts are those mono- or polyamines having an open chain or cyclic structure which have all of the amine hydrogen replaced by suitable substituents, such as hydrocarbon radicals, and preferably aliphatic, cycloaliphatic or aromatic radicals. Examples of these amines include, among others, methyl diethanol amine, triethylamine, tributylamine, dimethyl benzylamine, triphenyl amine, tricyclohexylamine, pyridine, quinoline, and the like. Preferred amines are the trialkyl, tricycloalkyl and triaryl amines, such as triethylamines, triphenylamines, tri(2,3 - dimethylcyclohexyl) amine, and the alkyl dialkanol amines, such as methyl diethanol amines. Weak tertiary amines, e.g., amines that in aqueous solutions give a pH less than 10, are particularly preferred.

The quaternary ammonium salts that may be used as catalysts for the reaction are preferably those of the formula

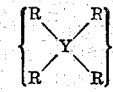

wherein Y is nitrogen, X is an ion of an inorganic acid, and R is a hydrocarbon radical, such as an alkyl, cycloalkyl, aryl, alkaryl, arylalkyl, and the like radicals. Examples of these salts include, among others, benzyltrimethylammonium chloride, benzyltrimethylammonium sulfate, benzyltrimethylammonium nitrate, diphenyldimethylammonium borate, diphenyldimethylammonium nitrate, and the like.

Particularly preferred quaternary ammonium salts are those of the above formula wherein R is an alkyl, aryl, or arylalkyl radical, preferably containing no more than 12 carbon atoms and X is a chlorine or bromine, such as benzyltrimethylammonium chloride, benzyltrimethylammonium bromide, cyclohexyltrimethylammonium bromide, phenyltrioctylammonium chloride and tetraoctylammonium chloride.

The organo-substituted phosphines that may be used as catalysts may be exemplified by the formula $P(R)_3$ wherein at least one R is an organic radical and the other R's are hydrogen or organic radicals which may be the same or different from the first R. Preferred phosphines include the trihydrocarbyl phosphines, the dihydrocarbyl phosphines and monohydrocarbyl phosphines, such as tricyclohexyl phosphine, triphenyl phosphine, trioctyl phosphine, diphenyl cyclohexyl diphenyl phosphine, tributyl phosphine, trixylyl phosphine, tridodecyl phosphine, cyclohexyl octyl phosphine and the like. Particularly preferred phosphines include the trialkyl, the tricycloalkyl, the tri-(alkylcycloalkyl), and the triaryl and tri(alkaryl)phosphines and particularly those wherein each of the hydrocarbon radicals attached to the phosphorus atoms contains no more than 12 carbon atoms, and still more preferably no more than 8 carbon atoms, with a total number of carbon atoms preferably not being more than 30. Coming under special consideration, particularly because of their high degree of activity as catalysts are the aromatic hydrocarbyl phosphines as triphenyl phosphine.

These catalysts are preferably used in amounts preferably varying from about .05% to 3% by weight of the reactants.

Temperatures employed in the reaction will generally vary from about 50° C. to about 150° C. In most cases, the acidic component and the polyepoxide will be quite reactive and temperatures of the order of about 50° C. to 125° C. will be sufficient to effect the desired reaction. In other instances, it may be desirable to use higher temperatures, such as those from 125° C. to 175° C. Temperatures of 200° C. or over should generally not be employed.

The reaction is preferably conducted under atmospheric pressure, but it may be advantageous in some cases to employ subatmospheric or superatmospheric pressures.

The reaction may be conducted in the presence or absence of solvents or diluents. In most cases, the acidic component and polyepoxide will be liquid and the reaction may be easily effected without the addition of solvents or diluents. However, in some cases, whether either or both reactants are solids or viscous liquids it may be desirable to add diluents to assist in effecting the reaction, such as, for example, inert hydrocarbons as xylene, toluene, cyclohexane, and other materials as cyclohexanone, and the like.

If solvents are employed in the reaction and the formed condensate is to be used for coating compositions, the solvent may be retained with the condensate. Otherwise, the solvent should be removed by any suitable method such as vacuum distillation and the like. If the condensate is not to be utilized for some time after its formation, it will also be desirable to remove the catalyst used in the preparation. This may be accomplished by neutralization, stripping or the like.

The finished condensate produced by the above process will vary from viscous liquids to solid brittle resins. The products will be substantially free of acidic groups and will contain epoxy groups. The products prepared from the use of acids as the acidic component will contain some free OH groups, but those prepared from the anhydrides will be relatively free of formed OH groups. The products of the invention are also soluble in solvents such as acetone, toluene, benzene, xylene, and the like. They are non-heat curable i.e. they cannot be cured to an insoluble infusible stage by heat alone. The products will also be of much higher molecular weight than the basic polyepoxide from which they are formed, and in most cases will contain at least 2 of the polyepoxide units and preferably 3 to 10 polyepoxide units.

The products prepared from the dibasic acid components are linear and may be theoretically described as having the formula

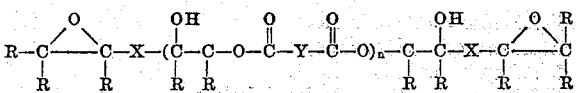

wherein R is hydrogen or hydrocarbon radical, X is organic radical, Y is residue of the dibasic acid and n is an integer and preferably 1 to 10.

Part of the product prepared from two moles of the dibasic acid anhydrides and 3 moles of the diepoxide is believed to have a linear structure similar to the formula

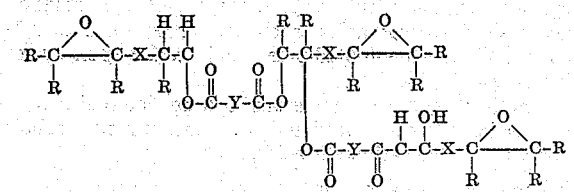

wherein R and X are as described above and Y is the residue of the dibasic anhydride.

The expression "linear" as used in the preceding two paragraphs and appended claims refers to lack of cross-linking but includes the possibility of side branching as noted in the structure shown in the preceding paragraph.

As the condensates of the present invention possess epoxy groups they may be cured with epoxy curing agents to form insoluble infusible products. For this purpose, epoxy curing agents which are acidic, neutral or alkaline may be added.

Examples of the curing agents include, among others, alkalies like sodium or potassium hydroxides; alkali phenoxides like sodium phenoxide; carboxylic acids or anhydride, such as formic acid, oxalic acid or phthalic anhydride; dimer or trimer acids derived from unsaturated fatty acids, 1,20-eicosanedioic acid, and the like. Friedel-Crafts metal halides like aluminum chloride, zinc chloride, ferric chloride or boron trifluoride as well as complexes thereof with ethers, acid anhydrides, ketones, diazonium salts, etc.; salts, such as zinc fluoborate, magnesium perchlorate and zinc fluosilicate; phosphoric acid and partial esters thereof including n-butyl orthophosphate, diethyl ortho-phosphate, hexaethyl tetraphosphate; amino compounds, such as, for example, diethylene triamine, triethylene tetramine, dicyandiamide, melamine, pyridine, cyclohexylamine, benzyldimethylamine, benzylamine, diethylaniline, triethanolamine, piperidine, tetramethyl piperazine, N,N-diethyl-1,3-propane diamine, 1,2-diamino-2-methylpropane, 2,3-diamino-2-methylbutane, 2,4-diamino-2-methylpentane, 2,4-diamino-2,6-dimethyloctane, dibutylamine, dinonylamine, distearylamine, diallyl amine, dicyclohexylamine, ethylcyclohexylamine, o-tolylnaphthylamine, pyrrolidine, 2-methylpyrrolidine, tetrahydropyridine, 2-methylpiperdine, 2,6-dimethylpiperidine, diaminopyridine, tetramethylpentane, metaphenylene diamine, and the like, and soluble adducts of amines and polyepoxides and their salts, such as described in U.S. 2,651,589 and U.S. 2,640,037.

Preferred curing agents are the polycarboxylic acids and acid anhydrides, the primary and secondary aliphatic, cycloaliphatic and aromatic amines and adducts of these amines and polyepoxides. In addition, urea-formaldehyde, melamine-formaldehyde and phenol-formaldehyde resins can also be used to cure the compositions of the invention, particularly when baked coatings are desired.

The amount of the curing agent employed may vary widely. In general, the amount of the curing agent will vary from about 0.5% to 200% by weight of the polyepoxide. The tertiary amines and $BF_3$-complexes are preferably employed in amounts varying from about 0.5% to 20% and the metal salts are preferably employed in amounts varying from about 1% to 15%. The secondary and primary amines, acids and anhydrides are preferably employed in at least stoichiometric amounts, i.e., sufficient amount to furnish one amine hydrogen or one anhydride group for every epoxy group, and more preferably stoichiometric rations varying from 1:1 to 25:1.

The condensates of the invention are particularly useful and valuable in the preparation of surface coating compositions. In this application, the condensate is usually mixed with one or more of suitable solvents or diluents, such as, for example ketones, such as methyl isobutyl ketone, acetone, methyl ethyl ketone, isophorone, esters, such as ethyl acetone, Cellosolve acetate (ethylene glycol monoacetate), methyl Cellosolve acetate (acetate of ethylene glycol monoethyl ether), etc.; ether alcohols, such as methyl, ethyl or butyl ether of ethylene glycol or diethylene glycol, chlorinated hydrocarbons, such as trichloropane; hydrocarbons, such as benzene, toluene, xylene and the like, to give a mixture suitable viscosity for spraying, brushing or dipping, and then the necessary curing agent as described above may be added alone or in admixture with a suitable solvent. The cure of the coating compositions thus prepared may be preferably accomplished by the application of heat. Satisfactory cures are obtained generally with temperatures of 60° C. up to 200° C.

Additional materials may be added in the preparation of the coating compositions to vary the properties. Such materials include pigments, dyes, stabilizers, plasticizers and various bodying agents as oils, resins and tars. Materials, such as coal tars, asphalts, and the like are particularly desirable for use when the coatings are to be employed for the treatment of roadways, floors and the like.

The coatings prepared from the condensates of the invention are characterized, as noted above, by their hardness, chemical resistance and good adhesions. The coatings also possess good flexibility, particularly in the case of the condensates prepared from aliphatic or cycloaliphatic acids or anhydrides, and good water resistance, particularly in the case of the condensates prepared from anhydrides.

Another important application of the products of the invention is in the preparation of laminates or resinous articles reinforced with fibrous materials. Although it is generally preferred to utilize glass cloth for this purpose, any of the other suitable fibrous materials in sheet form may be employed, such as glass matting, paper, asbestos paper, mica flakes, cotton bats, duck muslin, canvas, and the like.

In preparing the laminate, the sheets of fibrous material are first impregnated with the mixture containing the condensate and curing agent. This is preferably accomplished by dissolving the condensate and curing agent in acetone or a suitable solvent. The sheets of fibrous material are then impregnated with the mixture by spreading it thereon or by dipping or otherwise immersing them in the impregnant. The solvent is conveniently removed by evaporation and the mixture is cured to by the application of heat as noted above.

Another important use of the compositions of the invention is the production of molded articles. A molding is first prepared by milling together a mixture of the condensate and curing agent with customary fillers and mold release agents. Usually the milled mixture is set up so that a fusible resin is first obtained. The milled mixture is then ground and molded articles obtained therefrom with conversion of the fusible resin into the infusible state with use of molding machines such as those for compression molding or transfer molding. If desired, fusible milled mixture may be prepared in preform pellets and the like.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

EXAMPLE I

This example illustrates the preparation and some of the properties of an epoxy-containing condensate obtained from Polyether A and phthalic anhydride.

57 parts of phthalic anhydride was dissolved in 300 parts of Polyether A by heating to 80° C. in a reaction flask equipped with stirrer, condenser and thermometer. The temperature was then increased to 100° C. and 3.6 parts of methyl diethanolamine was added causing the reaction to exotherm to a temperature of 154° C. Stirring was continued for four hours and the temperature dropped slowly to 100° C. where it was maintained until the end of the heating period. The resulting product was a brittle solid resin having a epoxy value of 0.313 eq./100 g., an OH value of 0.09 and an acidity of 0.007.

A coating composition was prepared by adding the above adduct to a solvent comprising ½ methyl isobutyl ketone and ½ xylene and 2 parts (per hundred of the above adduct) of diethylene triamine and the mixture spread on steel panels and cured at 150° C. for 15 minutes. The resulting product was a hard tough flexible coating which was unaffected by boiling acetone and water.

EXAMPLE II

This example illustrates the preparation and some of the properties of an epoxy-containing condensate obtained from Polyether A and isophthalic acid.

768 parts of Polyether A was placed in a reaction flask as described in Example I and 46 parts of isophthalic acid added at room temperature. 8 parts of methyl diethanol amine was then added and heat applied to raise temperature to about 140° C. 120 parts of isophthalic acid was then added in small increments over a 30 minute period. The mixture was then stirred for 1 hour at 150° C. The resulting product was a brittle solid having an epoxy value of 0.217 eq./100 g.

A coating composition was prepared by mixing the above-described solid resin with a solvent comprising ½ methyl isobutyl ketone and ½ xylene and 2 parts (per hundred of the above adduct) of diethylene triamine and the mixture spread on steel panels and cured at 150° C. for 15 minutes. The resulting product was a hard tough flexible coating which was unaffected by 15 minutes' boiling acetone and boiling water. A similar coating cured at room temperature in several days to form a hard flexible coating which was insoluble and infusible.

EXAMPLE III

This example illustrates the preparation and some of of the properties of an epoxy-containing condensate obtained from Polyether A and dodecenylsuccinic anhydride.

300 parts of Polyether A and 50 parts of dodecenylsuccinic anhydride was placed in a reaction flask as described in Example I. The mixture was heated to 60° C. to dissolve the anhydride. 3.6 parts of methyl diethanol amine was then added and the mixture heated to 115° C. with continuous addition of 50.3 parts of the anhydride. The reaction exothermed to 155° C. and then the temperature dropped to 125° C. where it was maintained for 4 hours. The resulting product was a viscous liquid having an epoxy value of 0.276 eq./100 g. and a hydroxy value of 0.112.

A coating composition was prepared by mixing the above-described liquid with solvent comprising ½ methyl isobutyl ketone and ½ xylene and 2 parts (per hundred of the above adduct) of diethylene triamine and the mixture spread on steel panels and cured at 150° C. for 15 minutes. The resulting product was a hard tough flexible coating which was unaffected by boiling acetone and water.

EXAMPLE IV

This example illustrates the preparation and some of the properties of an epoxy-containing condensate prepared from Polyether A and sebacic acid anhydride.

300 parts of Polyether A and 72 parts of sebacic acid anhydride were placed in the flask described in Example I and the mixture heated at 100–110° C. to dissolve the mixture. Heat was turned off and 3.6 parts of methyl diethanolamine was added at 105° C. The temperature increased rapidly to 136° C. The mixture was cooled to 100° C. and maintained at that temperature for 3½ hours with stirring. The resulting product was a viscous liquid having an epoxy value of 0.213 eq./100 g.

A coating composition was prepared by mixing 25 parts of the above liquid with 1.29 parts of Beetle 216–8, 17.2 parts of a solvent made up of ½ methylisobutyl ketone and ½ xylene. 5 parts of diethylene triamine was added to the portion containing 100 parts of the adduct and the mixture spread on steel panels and cured at 150° C. for 30 minutes. The resulting product was a hard tough flexible coating unaffected by boiling toluene, methyl isobutyl ketone and boiling water.

EXAMPLE V

This example illustrates the preparation and some of the properties of an epoxy-containing condensate prepared from Polyether A and an open-chain $C_{19}$ dicarboxylic acid.

158 parts of Polyether A and 70 parts of a $C_{19}$ acid (prepared from oleic acid by addition of CO and water catalyzed by $H_2SO_4$) were placed in a reaction flask and heated to 55° C. When the acid had dissolved, the heat was turned off and 1.64 parts of methyl diethanol amine added. 60 parts of the acid was then added in small portions over a ½ hour period. The mixture was maintained at 152° C. for about 1 hour with stirring. The resulting product was a viscous liquid containing epoxy groups, epoxy value 0.137 eq./100 g.

A coating composition was prepared by mixing 25 parts of the above-described condensate with 1.2 parts of Beetle 216–8 and a solvent made up of ⅓ methyl isobutyl ketone, ⅓ xylene and ⅓ Cellosolve acetate (17.2 parts). 3 parts of diethylene triamine was added to this mixture and the coating spread on steel panels. The panels were baked at 150° C. for 15 minutes. The resulting films were hard tough and flexible and unaffected by boiling water and acetone.

EXAMPLE VI

This example illustrates the preparation and some of the properties of an epoxy-containing condensate prepared from epoxidized tetrahydrobenzyl tetrahydrobenzoate and isophthalic acid.

75 parts of epoxidized tetrahydrobenzoate having an epoxy value of 0.70 and 5 parts of isophthalic acid were placed in a reaction flask as described in Example I. To this mixture was added 1.5 parts of methyl diethanol amine and the mixture heated. After the amine dissolved, 16.5 parts of isophthalic acid was then added. This addition took about ½ hour and during that time, the temperature rose to 151° C. The reaction was stirred for another ½ hour at 150° C. The resulting product was a solid resin containing an epoxy value of 0.246 eq./100 g.

A coating composition was prepared from the above by combining 12.6 parts of the above adduct with a solvent containing ½ methylisobutylketone and ½ xylene and 8.6 parts of Beetle 216–8. To this solution was added 4.6 parts of hexahydrophthalic anhydride and 1% methyl diethanolamine. This mixture was spread on steel panels and cured at 150° C. for 30 minutes. The resulting films were hard and flexible and resistant to toluene and boiling water and acetone.

Related results are obtained by replacing the epoxidized tetrahydrobenzyl tetrahydrobenzoate with equivalent amounts of each of the following: epoxidized ethylene glycol di(tetrahydrobenzoate), epoxidized di(tetrahydrobenzyl)phthalate and epoxidized 2,2-bis(cyclohexenyl)-propane.

EXAMPLE VII

This example illustrates the preparation and some of the properties of an epoxy-containing condensate obtained from Polyether A and dimerized octadecadienoic acid.

384 parts of Polyether A and 296 parts of dimerized octadecadienoic acid were placed in a reaction flask as noted in Example I and the mixture heated. When the temperature reached 120° C., 6.8 parts of methyl diethanolamine was added. At this time, heat was turned off. A slight exotherm occurred bringing the temperature up to 142° C. 246 parts of the acid was then slowly added at 150° C. over a period of 2 hours. The resulting product was a viscous liquid having a high epoxy value.

A coating composition was prepared by mixing the above adduct with a solvent as described in Example I and 2 parts (per hundred parts of adduct) of diethylene triamine and the mixture spread on steel panels and cured at 150° C. for 30 minutes. The resulting product was a hard flexible coating having good resistance to boiling acetone and boiling water.

EXAMPLE VIII

This example illustrates the preparation and some of the properties of an epoxy-containing condensate obtained from Polyether A and 8,12-eicosadienedioic acid anhydride.

25 parts of Polyether A and 10.5 parts of 8,12-eicosadienedioic acid anhydride were placed in a reaction flask as in Example I and the mixture heated. 3 parts of methyl diethanolamine was added and the temperature held at 100° C. for 4 hours. The resulting product was a viscous liquid having an epoxy value of 0.25 eq./100 g.

A coating composition was prepared by mixing the above adduct with a solvent as described in Example I and 10 parts (per hundred parts of adduct) of an adduct of Polyether A and diethylene triamine and the mixture spread on steel panels and the films cured at 150° C. for 30 minutes. The resulting product was a hard flexible coating which was unaffected by boiling acetone and water.

EXAMPLE IX

This example illustrates the preparation and some of the properties of an epoxy-containing condensate obtained from Polyether B and sebacic acid anhydride.

300 parts of Polyether B and 60 parts of sebacic acid anhydride are placed in a reaction flask and the mixture heated to 100° C. to dissolve the mixture. 3.6 parts of triphenyl phosphine was added and the mixture maintained at 125° C. for several hours. The resulting product was a viscous liquid having an epoxy value of about 0.25 eq./100 g.

A coating composition was prepared as in Example IV. The cured film is hard and tough and has excellent resistance to solvents.

EXAMPLE X

This example illustrates the preparation and some of the properties of an epoxy-containing condensate obtained from diglycidyl ether and sebacic acid anhydride.

260 parts of diglycidyl ether and 190 parts of sebacic acid anhydride are placed in a reaction flask and the mixture heated to 100° C. 3 parts of benzyldimethyl ammonium chloride are added and the mixture maintained at 125° C. for several hours. The resulting product is a viscous liquid having a high epoxy value.

A coating composition is prepared as in Example IV. The cured film is hard and tough and has excellent resistance to solvents.

EXAMPLE XI

This example illustrates the preparation and some of the properties of an epoxy-containing condensate obtained from Polyether C and a 50:50 mixture by weight of sebacic acid and isophthalic acid anhydride.

2.0 equivalents of Polyether C are placed in the reaction flask as described in Example I and 3.6 parts of methyl diethanolamine added. The 50:50 mixture by weight of sebacic acid and isophthalic acid anhydride is then slowly added over a period of 2 hours while the temperature is kept below 125° C. The resulting product is an acetone-soluble resin having a high epoxy value and substantially no acidic groups.

A coating composition is prepared as in Example IV. The cured film is hard and tough and has excellent resistance to solvents.

I claim as my invention:

1. A linear acetone-soluble non-heat curable epoxy-containing condensate of an acidic material of the group consisting of polycarboxylic acids, polycarboxylic acid anhydrides and mixtures thereof with from 1.5 times to 4 times the chemical equivalent amount of a polyepoxide containing more than one vic-epoxy group and having no additional substituent capable of reacting with said acidic material other than hydroxyl, the expression "equivalent amount" as used herein refers to that amount needed to furnish one acidic group per epoxy group.

2. A condensate as in claim 1 wherein the polyepoxide is a polyglycidyl ether of a polyhydric compound of the group consisting of polyhydric alcohols and polyhydric phenols.

3. A condensate as in claim 1 wherein the acidic material is a polycarboxylic acid anhydride containing up to and including 20 carbon atoms.

4. A condensate as in claim 1 wherein the acid material is an aromatic dicarboxylic acid anhydride.

5. A condensate as in claim 1 wherein the acidic material is an aliphatic dicarboxylic acid containing up to and including 20 carbon atoms.

6. A condensate as in claim 1 wherein the polyepoxide is an aliphatic organic compound possessing at least one internal vic-epoxy group.

7. A condensate as in claim 1 wherein the polyepoxide is an epoxidized polyethylenically unsaturated ester.

8. A condensate as in claim 1 wherein the polyepoxide is a diglycidyl ether of 2,2-bis(4-hydroxyphenyl) propane.

9. A condensate as in claim 1 wherein the polyepoxide is epoxidized tetrahydrobenzyl tetrahydrobenzoate.

10. A condensate as in claim 1 wherein the polyepoxide is epoxidized 2,2-bis(cyclohexenyl)propane.

11. A condensate as in claim 1 wherein the polyepoxide is a polyglycidyl ether of glycerol.

12. A condensate as in claim 1 wherein the acidic material is phthalic anhydride.

13. A condensate as in claim 1 wherein the acidic material is sebacic acid anhydride.

14. A condensate as in claim 1 wherein the acidic material is a polymerized unsaturated fatty acid.

15. A condensate as in claim 1 wherein the acidic materail is eicosadienedioic acid.

16. A process for preparing a linar acetone-soluble non-heat curable epoxy-containing condensate which comprises adding an acidic material of the group consisting of polybasic acids, polybasic and acid anhydrides and mixtures thereof to from 1.5 times to 4 times the equivalent amount of a polyepoxide containing more than one vic-epoxy group and having no additional substituent capable of reacting with said acidic material other than hydroxyl in the presence of a catalyst of the group consisting of tertiary amines, quaternary ammonium salts and organic phosphines, the expression "equivalent amount" as used herein refers to that amount needed to furnish one acidic group per epoxy group.

17. An insoluble infusible product obtained by mixing the epoxy-containing materail defined in claim 1 with from 0.5% to 200% by weight of an amine.

18. An insoluble infusible product obtained by heating the epoxy-containing material defined in claim 1 with an approximately chemically equivalent amount of an amine at a temperature between 60° C. and 200° C., as used herein the expression "equivalent amount" refers to that needed to furnish one amino hydrogen per epoxy group.

References Cited in the file of this patent

UNITED STATES PATENTS

| | | |
|---|---|---|
| 2,324,483 | Castan | July 20, 1943 |
| 2,500,600 | Bradley | Mar. 14, 1950 |
| 2,504,518 | Greenlee | Apr. 18, 1950 |
| 2,604,464 | Segall et al. | July 22, 1952 |
| 2,637,716 | Ott | May 5, 1953 |
| 2,801,229 | De Hoff et al. | July 30, 1957 |
| 2,801,989 | Farnham | July 30, 1957 |